Patented Nov. 6, 1923.

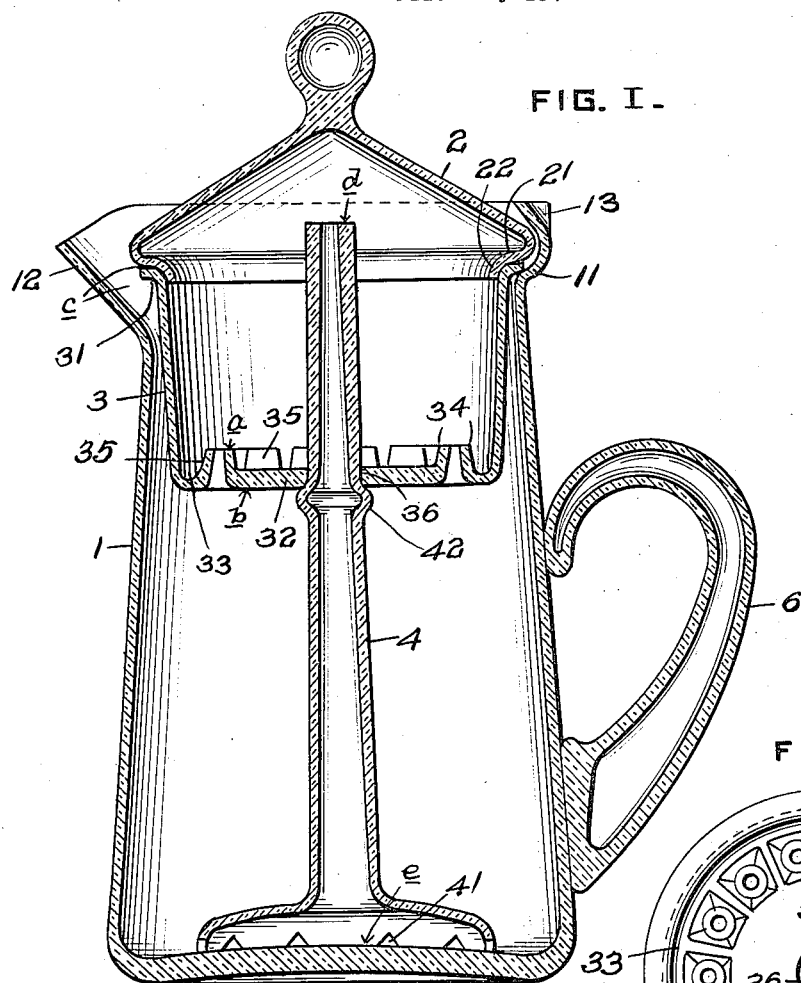
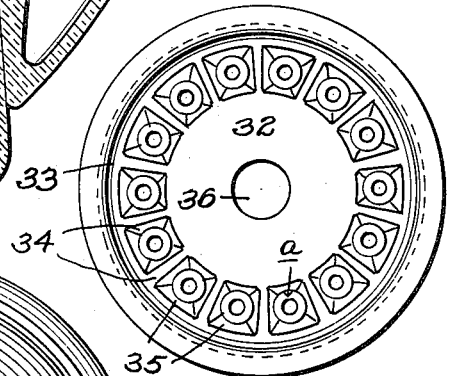
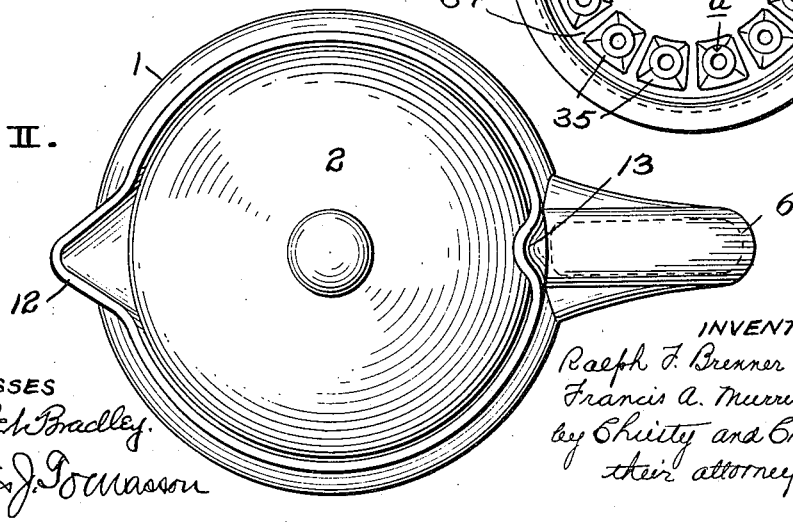

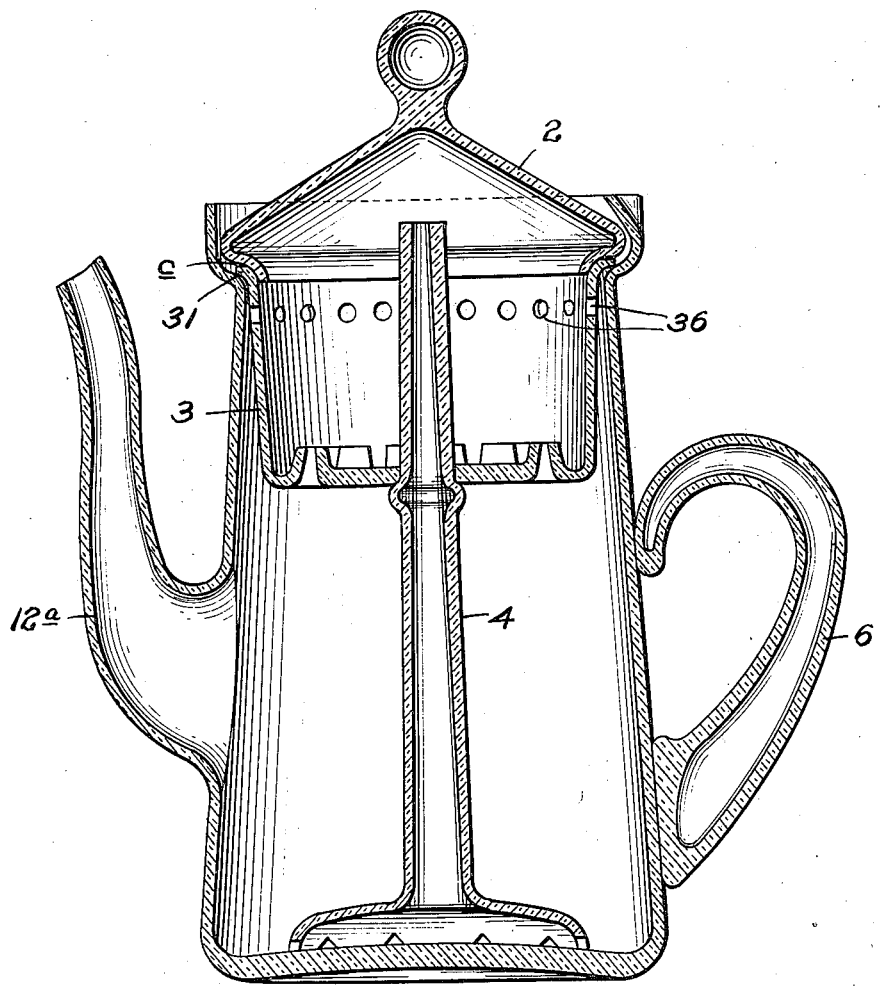

1,472,901

UNITED STATES PATENT OFFICE.

RALPH F. BRENNER AND FRANCIS A. MURRIN, OF ROCHESTER, PENNSYLVANIA, ASSIGNORS TO H. C. FRY GLASS COMPANY, OF ROCHESTER, PENNSYLVANIA, A CORPORATION OF PENNSYLVANIA.

COFFEEPOT.

Application filed May 19, 1922. Serial No. 562,103.

*To all whom it may concern:*

Be it known that we, RALPH F. BRENNER and FRANCIS A. MURRIN, residing at Rochester, in the county of Beaver and State of Pennsylvania, citizens of the United States, have invented or discovered certain new and useful Improvements in Coffeepots, of which improvements the following is a specification.

Our invention relates to coffee pots and consists in a drip coffee pot, or percolator coffee pot, made wholly of glass. The discovery of late years that glass of relatively low thermal expansion and of relatively great toughness may be cheaply produced, opens wide the field of cooking utensils formed of this material.

It is a prime requisite to the making of good coffee that the coffee pot, repetitively used, be washed clean after each use. Accordingly, that coffee pot is best which, other things being equal, is simplest and easiest of access in all its parts for washing. Of all conceivable materials none is so well adapted to afford the desired cleanness in service as glass. Furthermore, the transparency of glass makes for cleanliness and adapts the article particularly to sunning,—which, as good housewives know, is good practice in caring for the coffee pot. The coffee pot of our present application is made in all its parts preferably of glass. As we shall intimate in the course of the specification parts of it may be made of metal, but preferably, as we have said, it is in its entirety made of glass.

A glass coffee pot of our invention is shown in the accompanying drawings. Figure I is a view in vertical and medial section; Figure II is a plan view of the pot as a whole seen from above; Figure III is a bottom plan view of the percolator cup; and Fig. IV corresponding to Fig. I illustrates certain modification.

The pot as we here illustrate it consists of four parts, the pot proper 1, the lid 2, the percolator cup 3 and the fountain nozzle 4. The cup 3 and the fountain nozzle 4 might be integrated one with the other, but we preferably make them separate.

In the production of glass utensils which have to stand wide ranges of temperature, it is desirable that there be no wide departure from an average in the matter of wall thickness, no localized heavy masses of the constituent material. Accordingly, it will be observed of the pot here illustrated, that variations of this sort are not great; that it is such a glass article as would ordinarily be formed by blowing in a mold; and that even the handle 6 is shown to be blown hollow. To achieve perfect cleanliness the pot interiorly is smooth surfaced, free of angles and shoulders; the spout 12 is preferably, as here shown, merely an outwardly protruding lip formed by creasing the rim of the pot. This makes for simplicity of structure as well as for cleanliness in service. The lid is equally smooth surfaced and accessible. Fig. IV indicates that the pouring spout 12$^a$, instead of being a mere lip formed in the rim, may be a distinctly formed member leading from the bottom of the pot. The upper rim of the coffee pot is spread in a horizontally flaring surface 11, and then at the very edge is upturned vertically. The upper rim of the cup 3 is correspondingly flared, and by such means the percolator part may be hung in the pot by the rim of the cup, in the manner shown in Fig. I. The cover 2 is marginally inturned horizontally, as indicated at 21, and its edge forms a downwardly extending apron 22. The lid rests on the rim of the cup 3 when the percolator part is in place, or upon the rim of the pot when the percolator is not in place, and (the percolator being in place) the apron 22 of the lid extends downward within the upper edge of the cup.

The preferred form of spout has been mentioned, and the fact has been noted that it is merely a lip 12 bent out at one point from the generally circular rim of the pot.

In the rim of the pot opposite spout 12 is formed an in-bent crease or lip 13. This when the lid is in place overlies the outer surface of the lid. The proportions of lid with its rounded and inturned edge and depending apron and of the margin of the pot with its lip 13 are such that the lid can be seated only by tipping, to slip it beneath lip 13; and the lid when in place will be secure and will not be dislodged by the turning of the pot in pouring liquid from it.

While as we have said our invention relates itself particularly to a coffee pot made of glass as a material, it will be understood that pots of other material than glass are not excluded.

The receptacle for ground coffee is advantageously made of blown glass. (It might be pressed.) It is essentially cylindrical, with flaring rim 31, adapting it for engagement with and support upon the flaring margin 11 of the pot. The minute configuration of the bottom of the cup or receptacle 3 will be clearly understood on comparing Figures I and III. For purposes of description the bottom of the cup may be said to be formed in three concentric areas. A central area 32, a peripheral area 33, and an intermediate annular area 34. As appears in Figure I, the peripheral area 33 is lowest. The central area 32 is somewhat higher, while the intermediate area 34 rises still higher and separates the two areas 33 and 32. The intermediate annular area 34 is formed as a succession of protrusions 35 standing closely set side by side and merging one into another, each protrusion being centrally perforate. The cup 3 shown in Figs. I and III is perforate only through these openings in protrusions 35. It will be understood then that, adjacent the annular portion 34 of the bottom, are other portions which form troughs or depressions or pockets, and into these pockets, as the percolating stream passes, minute particles of coffee will be swept, and in them these minute particles will gather as in a trap, and in these depressed parts a fine mudlike sediment will gather and be retained, instead of passing through into the pool of coffee below. By this provision a clearer product of percolation is obtained. It will be understood that the side walls of the cup may if desired be perforate, but we find the elevated ring of perforations formed in the bottom of the cup as described, to be adequate and satisfactory. Perforations for a somewhat different purpose in the side walls of cup 3 are indicated at 36, Fig. IV. They are arranged near the upper rim of the cup and the function of perforations here is not primarily to allow the coffee to escape to the chamber below, for that function is primarily performed by the perforations near the bottom, but the primary function of the perforations near the rim of the cup is to prevent overflow over the rim of the cup with attendant escape of ground coffee.

We have said that the cup may be pressed. It may be pressed with the protrusions 35 closed above, and the openings through the protrusions may be achieved by subsequently grinding off the upper surfaces of the protrusions as at $a$. Similarly, the lower surfaces $b$ of the cup may be ground, and the upper surface of the rim $c$ may in like manner be ground.

Through the center of the bottom of the cup is formed an opening 36, and the bore of this perforation also may be ground to insure accuracy and closeness in fit of parts.

Through the central perforation 36 in the bottom of the cup extends the fountain nozzle 4. The only features of the fountain nozzle which distinguish it from such structures previously used are that it is made of glass, its upper and lower surfaces $d$ and $e$ may be ground true, that notches 41 may be formed in its lower edge (conveniently by grinding), and that intermediate its length a bulbous enlargement 42 may be formed by blowing. Indeed, it should have been said at first that this fountain nozzle may conveniently be formed by blowing. The position of the bulbous enlargment 42 is such that, when the parts are assembled, it immediately underlies the bottom of the cup 3 as clearly appears in Figure I. The cup may be supported by resting upon this enlargement, and the whole may rest upon the foot of the fountain nozzle, or, if preferred, and as has already been intimated, the cup may rest by its rim upon the rim of the pot, and the nozzle alone may rest upon its foot upon the bottom of the pot within, and in that case the enlargement 42 in the stem of the nozzle merely serves to prevent upward displacement of the nozzle under the stress of ebullition.

The simplicity of structure is manifest. The configuration particularly described of the cup is adapted to glass pressing operations, and both cup and nozzle, being made of glass, are not only smooth-surfaced, so as to be easily washed clean, but, being of glass, are quite impervious to the entrance of coffee into their substance, and, further, being formed of transparent material, the whole is penetrable by sunlight with its cleansing and antiseptic action.

We claim as our invention:

1. A one-piece, all glass percolator cup for a coffee pot having its bottom formed into three concentric areas, a marginal trough, a central area, and an intermediate annular area, said intermediate area being elevated above the marginal and central areas, the bottom of the cup being perforate at intervals throughout the extent of the said annular area.

2. A percolator fitting for a coffee pot including a downwardly flared upwardly tapered fountain nozzle formed of glass provided intermediate its height with an out-blown bulbous enlargement, and a glass cup for ground coffee having a centrally perforate bottom and adapted to be applied upon and to encircle said nozzle above the said enlargement therein, said cup being further provided with perforations for the passage of a percolating stream.

In testimony whereof we have hereunto set our hands.

RALPH F. BRENNER.
FRANCIS A. MURRIN.

Witnesses:
DAVID W. DENTON,
F. D. THOMPSON.